March 2, 1965 G. D. PIERCE 3,171,511
POSITIVE STOP FOR MACHINE TOOLS
Filed March 23, 1961
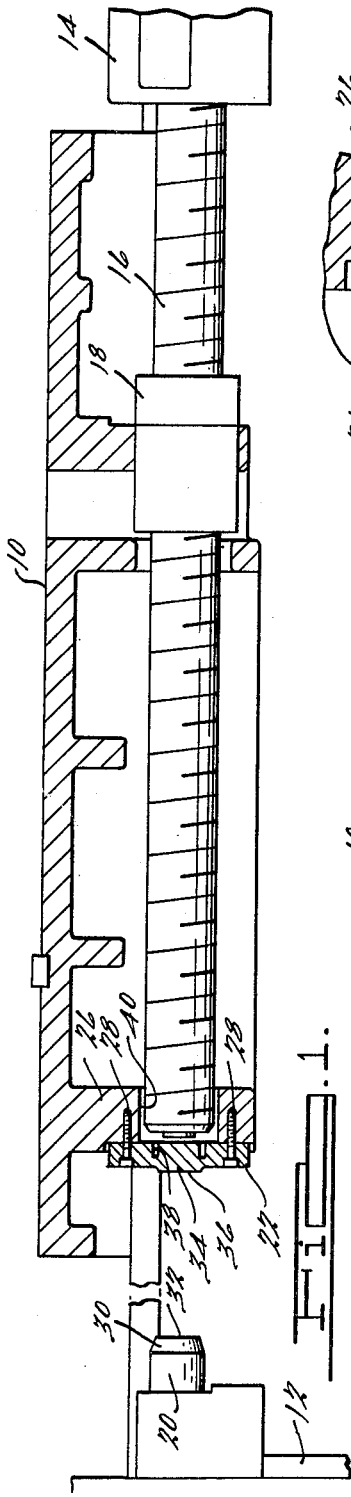
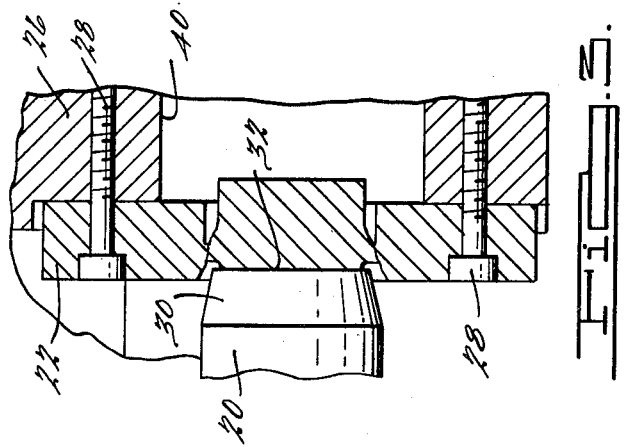
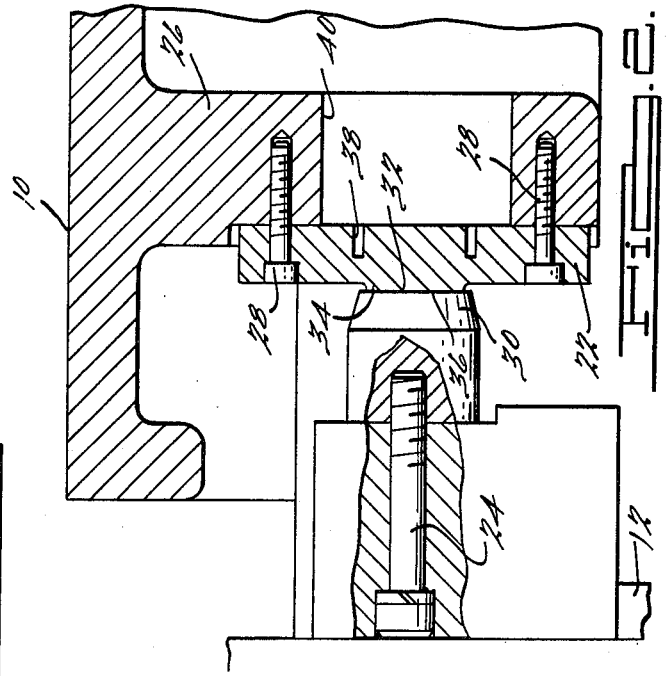
INVENTOR.
Guy D. Pierce.
BY
Harness, Dickey & Pierce
ATTORNEYS.

United States Patent Office 3,171,511
Patented Mar. 2, 1965

3,171,511
POSITIVE STOP FOR MACHINE TOOLS
Guy Donald Pierce, Detroit, Mich., assignor to The Cross Company, Fraser, Mich., a corporation of Michigan
Filed Mar. 23, 1961, Ser. No. 97,921
5 Claims. (Cl. 188—1)

This invention relates broadly to new and useful improvements in stop means for moving machine parts and more particularly to an improved positive stop for machine tools.

In the operation of a typical machine tool, the tool heads are advanced to bring the cutting tools into contact with the work and then retracted to the initial or starting position. Usually, the initial or rapid traverse portion of the forward movement is at a relatively high rate of speed. However, just prior to the time the tools engage the work, the head is slowed down and the final or feeding portion of the forward movement is at a relatively slow rate of speed. Almost invariably the head is brought against a positive stop at the forward limit of its travel. The stop ordinarily must be accurately positioned to prevent the tools from penetrating the work too far. Also, the stop must be essentially strong or rigid as the head moves against it under power at the feeding rate.

A common method of decelerating the head after rapid traverse is to trip a limit switch by means of a dog mounted on the head. The switch creates an electrical signal which shifts the drive to slow speed. Another method is to shift a hydraulic valve mechanically to shut off or reduce the flow of oil to the drive motor or cylinder and consequently to slow down the moving mass.

However, trouble sometimes results from a failure in the deceleration means or by improper setting of the switch operating dog. If this happens, the head does not slow down at the end of the rapid traverse but continues at the high traverse speed and crashes into the forward stop. Tool heads frequency weigh in excess of four thousand pounds, and a stop plate that will sustain the impact of the head at feed traverse rate cannot stop the head at the rapid traverse rate. As a result, the drive and other expensive parts of the machine frequently are damaged beyond repair.

An important object of this invention is to provide a positive stop that is sufficiently strong and rigid to withstand the impact force of a tool head, for example, moving at slow speed or feed traverse but that will fail under crash conditions and prevent damage to expensive mechanism or parts of the machine and that is inexpensive and readily replaceable.

Another object of the invention is to provide a positive stop of the above-mentioned character that is primarily adapted and pre-eminently suited for machine tools and the like but is adaptable to any equivalent environment or condition.

Other objects and advantages of the invention will be apparent during the course of the following description.

In the drawing forming a part of this specification and wherein like numerals are employed to designate like parts throughout the same, FIGURE 1 is a longitudinal sectional view showing a slide for a tool head or the like in retracted position reciprocally mounted on a base and equipped with stop means embodying the invention, FIGURE 2 is a view similar to FIGURE 1 but showing the slide in the advanced position and the stop means operative to locate the slide in the extreme forward position, and FIGURE 3 is a view similar to FIGURE 2 but showing the stop under crash conditions with the knock-out plug broken away from the plate and partly pushed through the knock-out hole.

In the drawing, by way of example only, is shown a typical environment for the positive stop of this invention. More specifically, there is shown a slide 10 mounted for reciprocatory travel on a base 12. A rotatably driven screw 16 mounted in a bearing housing 14 on the base 12 extends under this slide 10 parallel to its direction of travel and through a nut 18 on the slide. It will be readily apparent that as the screw 16 turns in the nut 18, it either advances or retracts the latter and the slide depending upon the direction of rotation of the screw.

In practice, the slide 10 may carry any suitable device or mechanism; however, in the case of a machine tool, it may conveniently be a support for a tool head. When adapted for this purpose, the slide 10 retracts the tool head to the position shown in FIGURE 1; and during the machine cycle it advances the head to the position shown in FIGURE 2 to bring cutting tools carried by the head against the work to perform a cutting or other operation thereon.

In conventional practice, dogs (not shown) on the slide 10 operate limit switches (not shown) on the base 12 to control the forward and retractive movement of the slide and in some instances, to regulate the rate at which the slide travels. Ordinarily, in the case of a machine tool, a limit switch positioned to be tripped before the slide 10 meets the end of its traverse motion causes the slide to proceed at a reduced speed or feed traverse and finally to move against a positive stop. When the limit switch operates properly and the mentioned control parts are properly positioned, the slide moves slowly against the stop without damage. Other means (not shown) are provided to reverse the direction of travel of the slide. These other means (usually another limit switch) stops the drive for the slide at the end of its stroke and provides interlock means for initiating a succeeding portion of the machine cycle. These switches and controls and the circuitry associated therewith are conventional and well known in the art and therefore are not shown in this application.

As suggested, this invention is concerned with the particular construction of the positive stop which limits movement of the slide or other movable part of the machine in one direction. Specifically, the stop comprises a stop button 20 and a stop plate 22 disposed for mutual engagement when the slide 10 is at one end of its travel. Manifestly, in order to achieve this result, it is necessary for the stop button 20 and the stop plate 22 to be mounted on relatively movable parts of the machine. In the form of the invention shown, the stop button 20 is fastened on one end of the base 12 by a screw 24 and the stop plate 22 is fastened on a downwardly depending web 26 on the slide 10 by screws 28. The stop plate 22 is disposed transversely of the direction of travel of the slide 10 and the stop button 20 is positioned in the path of travel of the stop plate. It will be readily apparent, however, that if desired the parts can be reversed and this modification is contemplated and within the scope of the invention. In the latter instance, the stop button 20 would be mounted on the slide 10 or other movable part of the machine and the stop plate 22 would be mounted on the base 12 or other stationary part of the machine.

More particularly with reference to the form of the invention shown, however, it will be observed that the stop button 20 is formed with a tapered terminal portion 30 having a flat end surface 32 and that the stop plate 22 is formed on the side thereof facing the stop button with an embossment 34 having a flat, machined top surface 36. When the slide 10 reaches the end of its travel in the direction of the stop button 20, the latter seats flatly against the embossment 34 to stop the slide accurately in its terminal position. In practice, the embossment 34 is accurately finished to determine the final position of the slide 10, and the use of the embossment eliminates the necessity of finishing the entire plate 22 in the final machine finishing operation.

On the side thereof opposite the stop button 20, the stop plate 22 is formed with an annular groove 38 of approximately the same diameter and concentric to the embossment 34 and it is significant that the groove is essentially thin as shown in the drawing. Also of significance is the fact that the groove 38 is at least as large in diameter as the minimum taper diameter of the stop button 20 but smaller in diameter than the maximum taper diameter of the stop button. A relatively large hole 40 is provided in the web 26 behind the central portion of the stop plate 22 and including the area encompassed by the groove 38.

Manifestly, the groove 38 leaves a cylindrical area of the stop plate 22 in shear when the plate is moved against the stop button 20. By reason of the fact that the groove 38 is essentially narrow, however, there is no appreciable or significant deflection of the plate 22 as it strikes the stop button 20 under relatively light impact conditions which are insufficient to rupture the plate. This, of course, is important in order to stop the slide 10 accurately at the end of its stroke. However, in the event a limit switch or other part controlling movement of the slide fails or otherwise is rendered inoperative so that the slide 10 fails to slow down before the stop plate 22 engages the stop button 20, the central portion of the stop plate within the groove 38 is sheared away by the impact. Thus, it will be readily apparent that the groove 38 must be cut just deep enough so that the remaining portion of the plate will have a calculated strength sufficient to resist shearing when the plate 22 is moved slowly against stop 20 but will fail under crash conditions and before other damage is done to the machine. In the event of a crash stop, the central portion of the stop plate 22 shears and is pushed through the hole 40, and the tapered end portion 30 of the stop button 20 wedges in the hole thus formed in the stop plate. As the tapered end of the stop button 20 wedges itself into the sheared-out hole in the stop plate 22, it dissipates the kinetic energy of the slide 10 and its adjuncts, thus preventing major damage to the drive for the slide or other vulnerable and expensive parts of the machine. Also, because of the shape and location of the groove 38, the sheared section of the plate 22 frequently flares outwardly away from the groove, and the enlarged head thus formed in the sheared-out disk or plug is forced through the hole ahead of the stop button 20. Inasmuch as the head of the plug under these conditions is larger than the knock-out hole, the head offers considerable resistance and serves to brake the slide initially before the button itself wedges in the hole. In any event, the combined braking effect of the plug and the button 20 is particularly effective in absorbing the kinetic energy of the slide.

From the foregoing, it will be apparent that I have accomplished the objects of my invention. I have provided a positive stop for a machine tool or the like that will function repeatedly to stop a moving mass or part of the machine accurately under normal operating conditions but will shear under crash conditions to dissipate gradually the kinetic energy of the mass so as to prevent damage to vulnerable and expensive parts of the machine.

What is claimed is:

1. In a machine tool or the like having relatively movable parts, a stop on one of said parts and a stop plate on the other of said parts, said stop and said stop plate being mutually engageable by movement of said parts relative to each other to limit said relative movement in one direction, said stop plate having a weakened area defining a knock-out plug and said stop having a tapered end portion engageable with said plug, the weakened area of said plate being at least as large as the minimum taper diameter of said stop but smaller than the maximum taper diameter of the stop having sufficient strength to stop relative movement between said parts in said one direction without appreciable or significant deflection under normal operating conditions but of insufficient strength to resist a crash stop thereof, whereby under crash conditions said stop fractures the weakened area of said stop plate and wedges the tapered end thereof into the sheared out hole thus formed in the plate and dissipates the kinetic energy of said parts.

2. In a machine tool or the like having a stationary part and a slidable part, a stop on one of said parts, and a stop plate on the other of said parts, said stop having a tapered end portion and said stop plate having an annular groove in one face of a diameter at least as large as the minimum taper diameter of said stop but smaller than the maximum taper diameter of the stop, said stop being engageable with the portion of said stop plate within said annular groove by movement of said slidable part to limit movement of the latter in one direction, said groove defining a weakened area in said stop plate of sufficient strength to stop said slidable part without appreciable or significant deflection under normal operating conditions but of insufficient strength to resist a crash stop thereof, whereby under crash conditions said stop fractures said stop plate at said annular groove and knocks out the portion of the plate inside the groove and the tapered end of the stop wedges in the hole thus formed in the plate and dissipates the kinetic energy of said moving part.

3. In a machine tool or the like having a stationary part and a slidable part, a stop on one of said parts, and a stop plate on the other of said parts, said stop having a tapered end portion, said stop plate having an annular groove in one face of greater diameter than the minimum taper diameter of said stop but smaller in diameter than the maximum taper diameter of the stop, said stop being engageable with the portion of said stop plate within said annular groove by movement of said slidable part to limit movement of the latter in one direction, said groove being essentially narrow so that engagement of said stop with the mentioned portion of said stop plate under normal operating conditions does not result in appreciable or significant deflection of the plate but whereby a crash engagement of said stop with the mentioned portion of said stop plate shears the latter at said annular groove and knocks out the portion of the plate inside the groove, whereupon the tapered end of the stop wedges in the hole thus formed in the plate and dissipates the kinetic energy of said moving parts.

4. In a machine tool or the like having a stationary part and a slidable part, a stop on one of said parts, and a stop plate on the other of said parts, said stop having a tapered end portion, and said stop plate having an annular groove in one face of greater diameter than the minimum taper diameter of said stop but smaller in diameter than the maximum taper diameter of the stop, said stop being engageable with the portion of said stop plate within said annular groove by movement of said slidable part to limit movement of the latter in one direction, said groove being essentially narrow whereby to prevent appreciable or significant deflection of the plate on normal engagement of said stop with the plate, the portion of said plate within said groove having an embossment formed with a finished top surface positioned to engage the end of the stop to limit movement of said slidable part, whereby under crash conditions said stop strikes said embossment and knocks out the portion of the plate inside the groove and wedges the tapered end of the stop in the hole thus formed to dissipate the kinetic energy of said moving parts.

5. In a machine tool or the like having a stationary part and a slidable part, a stop on one of said parts, and a stop plate on the other said parts, said stop being engageable with one side of said stop plate by movement of said slidable part to limit movement of the latter in one direction, said stop plate having an embossment on the side thereof engaged by said stop disposed to seat against the end of the latter to limit movement of said slidable part and an annular groove in the side thereof opposite said embossment substantially concentric to the embossment and defining a weakened area in said stop plate of sufficient strength to stop said slidable part without appreciable or significant deflection under normal operating conditions but of insufficient strength to resist a crash stop thereof, whereby under crash conditions said stop fractures said stop plate at said annular groove and pushes the sheared plug thus formed through the knock-out hole, said stop having a tapered end portion and the annular groove defining said knock-out hole being of a diameter of at least as large as the minimum taper diameter of said stop but smaller than the maximum taper diameter thereof, whereby under crash conditions the tapered end of the stop wedges into the knock-out hole in said stop plate and dissipates the kinetic energy of said moving part.

References Cited in the file of this patent
UNITED STATES PATENTS

| | | |
|---|---|---|
| 1,788,071 | Strout | Jan. 6, 1931 |
| 1,817,885 | Byerlein | Aug. 4, 1931 |
| 2,615,373 | Pegard | Oct. 28, 1952 |
| 2,776,695 | Wells | Jan. 8, 1957 |
| 2,812,843 | Hummel | Nov. 12, 1957 |